United States Patent [19]
McEwan

[11] Patent Number: 5,832,772
[45] Date of Patent: Nov. 10, 1998

[54] MICROPOWER RF MATERIAL PROXIMITY SENSOR

[75] Inventor: Thomas E. McEwan, Livermore, Calif.

[73] Assignee: The Regents of the University of California, Oakland, Calif.

[21] Appl. No.: 379,044

[22] Filed: Jan. 27, 1995

[51] Int. Cl.[6] .................................................. G01F 23/00
[52] U.S. Cl. ...................... 73/290 R; 73/304 C; 340/562
[58] Field of Search ............................ 73/290 R, 304 R; 340/618, 620, 512, 518, 520, 552, 556, 562

[56] References Cited

U.S. PATENT DOCUMENTS

| | | | |
|---|---|---|---|
| 3,641,544 | 2/1972 | Radin | 340/620 X |
| 3,697,971 | 10/1972 | Domin et al. | 340/562 |
| 3,732,538 | 5/1973 | Gillund et al. | 340/552 X |
| 3,733,597 | 5/1973 | Healey et al. | 340/562 |
| 3,743,865 | 7/1973 | Riechmann | 340/562 X |
| 3,801,799 | 4/1974 | Atkins | 307/116 |
| 3,807,231 | 4/1974 | Spaw | 73/290 R |
| 3,973,208 | 8/1976 | Diamond | 340/562 X |
| 4,002,996 | 1/1977 | Klebanoff et al. | 340/620 X |
| 4,099,167 | 7/1978 | Pomerantz et al. | 340/620 |
| 4,144,529 | 3/1979 | Miller et al. | 340/562 |
| 4,173,755 | 11/1979 | Bulter | 340/562 |
| 4,325,058 | 4/1982 | Wagner et al. | 340/562 |
| 4,345,167 | 8/1982 | Calvin | 340/562 X |
| 4,371,790 | 2/1983 | Manning et al. | 340/620 X |
| 4,729,245 | 3/1988 | Hansman, Jr. | 73/865 |
| 4,829,449 | 5/1989 | Polesnak | 73/861.03 X |
| 5,012,683 | 5/1991 | Davis | 73/864.24 |
| 5,083,470 | 1/1992 | Davis et al. | 73/864.24 |
| 5,184,500 | 2/1993 | Krema et al. | 73/23.2 |
| 5,245,295 | 9/1993 | Hata et al. | 324/683 |
| 5,337,039 | 8/1994 | Simon | 340/562 |
| 5,380,983 | 1/1995 | Cavada et al. | 340/562 X |
| 5,486,815 | 1/1996 | Wagner | 340/602 |
| 5,559,484 | 9/1996 | Nowicki et al. | 73/146.5 |

Primary Examiner—George M. Dombroske
Assistant Examiner—Paul D. Amrozowicz
Attorney, Agent, or Firm—Henry P. Sartorio

[57] ABSTRACT

A level detector or proximity detector for materials capable of sensing through plastic container walls or encapsulating materials is of the sensor. Thus, it can be used in corrosive environments, as well as in a wide variety of applications. An antenna has a characteristic impedance which depends on the materials in proximity to the antenna. An RF oscillator, which includes the antenna and is based on a single transistor in a Colpitt's configuration, produces an oscillating signal. A detector is coupled to the oscillator which signals changes in the oscillating signal caused by changes in the materials in proximity to the antenna. The oscillator is turned on and off at a pulse repetition frequency with a low duty cycle to conserve power. The antenna consists of a straight monopole about one-quarter wavelength long at the nominal frequency of the oscillator. The antenna may be horizontally disposed on a container and very accurately detects the fill level within the container as the material inside the container reaches the level of the antenna.

41 Claims, 3 Drawing Sheets

MICROPOWER RF MATERIAL PROXIMITY SENSOR

The United States government has rights in this invention pursuant to Contract Number W-7405-ENG-48 between the United States Department of Energy and the University of California for the operation of Lawrence Livermore National Laboratory.

BACKGROUND OF THE INVENTION

1. Field of the Invention

The present invention relates to the field of material proximity sensors, such as used for fill level detection in containers of material like chemical vats, fuel tanks, grain silos, and water tanks, or for proximity detectors in security or safety systems.

2. Description of Related Art

In industry, there are a variety of uses for material proximity sensors that can sense through the walls of plastic vats or containers to determine the fill levels within the vats, especially for acids or flammable fluids. Typically, the contents of such containers have been detected using capacitive sensors. Basically, when the fill level of the container reaches a point near the capacitive sensor, a change is sensed in capacitance, and the level is detected. However, this capacitive sensing is subject to errors caused by thin sheets of water, grime, foam, and ionically conductive coatings that may be found inside of vat walls, such as salty brine residue. Another type of sensor is based on ultra-sound, which detects the reflections of ultrasonic waves off the surface of the material in the vat. However, this approach is also sensitive to misreadings caused by foam on the top of the material to be sensed, the exposure of the transducers to the interior of the vat, and other problems.

Accordingly, it is desirable to provide an accurate, low cost sensor which is capable of sensing through plastic container walls, or through encapsulators for the sensor, such that it may be used with corrosive or flammable materials or otherwise hostile materials. Also, it is desirable to provide a low cost sensor which can be used in a variety of applications, such as sensing grain levels in a silo, icing on wings or pavements, fluid levels in tanks, such as toilet tanks, windshield wiper fluid tanks in automobiles, gas tanks, and the like.

SUMMARY OF THE INVENTION

The present invention provides a proximity detector for materials which is capable of sensing through plastic container walls or encapsulating materials of the sensor. Thus, it can be used in corrosive environments, as well as in a wide variety of applications, as mentioned above.

The apparatus comprises an antenna which has a characteristic impedance which depends on the materials in proximity to the antenna. An oscillator, which includes the antenna, produces an oscillating signal. A detector is coupled to the oscillator to detect changes in the oscillating signal caused by changes in the materials in proximity to the antenna. The oscillator is turned on and off at a pulse repetition frequency with a low duty cycle to conserve power. Thus, the power consumption of this system is quite low, allowing battery operation for long periods of time.

The antenna of the preferred embodiment consists of a straight monopole about one-quarter wavelength long at the nominal frequency of the oscillator. For level detection, the antenna is horizontally disposed on a container and very accurately detects the fill level within the container as the material inside the container reaches the level of the antenna. The antenna can be mounted on the outside of the container or encapsulated within protective material and mounted inside the container. This provides the ability to use the level sensor of the present invention with highly corrosive material.

The frequency of the oscillator according to the present invention ranges from greater than 100 MHz to greater than 1 GHz. For instance, a preferred system is operated near 2 GHz in the FCC Part 15 band. The 2 GHz signal is capable of sensing through the wall of a plastic container up to about one-quarter of an inch thick. For thicker containers, a lower frequency is used. For instance, a 300 MHz oscillator can sense through a thickness of less than about one inch.

The present invention is a very simple device implemented with low cost components. Thus, it can be characterized as an apparatus for detecting proximity of a material which comprises an antenna, a bipolar transistor having its collector coupled to the antenna and forming a resonant circuit which oscillates at a nominal frequency with an amplitude dependent on the presence of material in proximity to the antenna. The base of the transistor is coupled to a bias potential, and the emitter of the transistor is coupled to a control circuit which turns the oscillator on and off at a pulse repetition frequency. A detector is coupled to the emitter junction of the transistor, to detect changes in the oscillation of the resonant circuit caused by changes in the materials in proximity of the antenna.

According to one aspect of the invention, the duty cycle of the control circuit is less than 1%, for instance 0.1%. The detector comprises a pulse stretching circuit coupled to the emitter terminal of the transistor, and a threshold detector coupled to the pulse stretching circuit which indicates when amplitudes of a sequence of bursts of oscillation vary by a threshold amount. Thus, the present invention provides a level detecting switch or fill level limit switch, such as indicating an "empty" or "full" state of vats, gas tanks, toilet tanks, and other containers. The sensor may be mounted on the outside surface of the container wall, or on the inside wall if properly sealed. The present invention senses the presence of fluid or material in the vat in volume as opposed to merely wetted surfaces on the walls of the vat. The output is an on/off control signal which can be used for controlling switches, for warning lights, alarms, or other processing.

The present invention arose from a strong need in industry for a fill level sensor that can sense through plastic vats, especially for acids and flammable fluids. The present invention accomplishes this result with a minimum of low cost components.

Naturally, the present invention may be applied to materials other than fluids, such as grain levels in a silo, icing on wings or pavement, et cetera. Also, the sensor may be used as a simple proximity switch for mechanical movement or limit switching, such as for robotics or elevator stop positioning.

Accordingly, the present invention provides a low cost, versatile sensor with very low power consumption.

Other aspects and advantages of the present invention can be seen upon review of the Figures, the detailed description and the claims that follow.

DETAILED DESCRIPTION OF THE FIGURES

Figure 1:
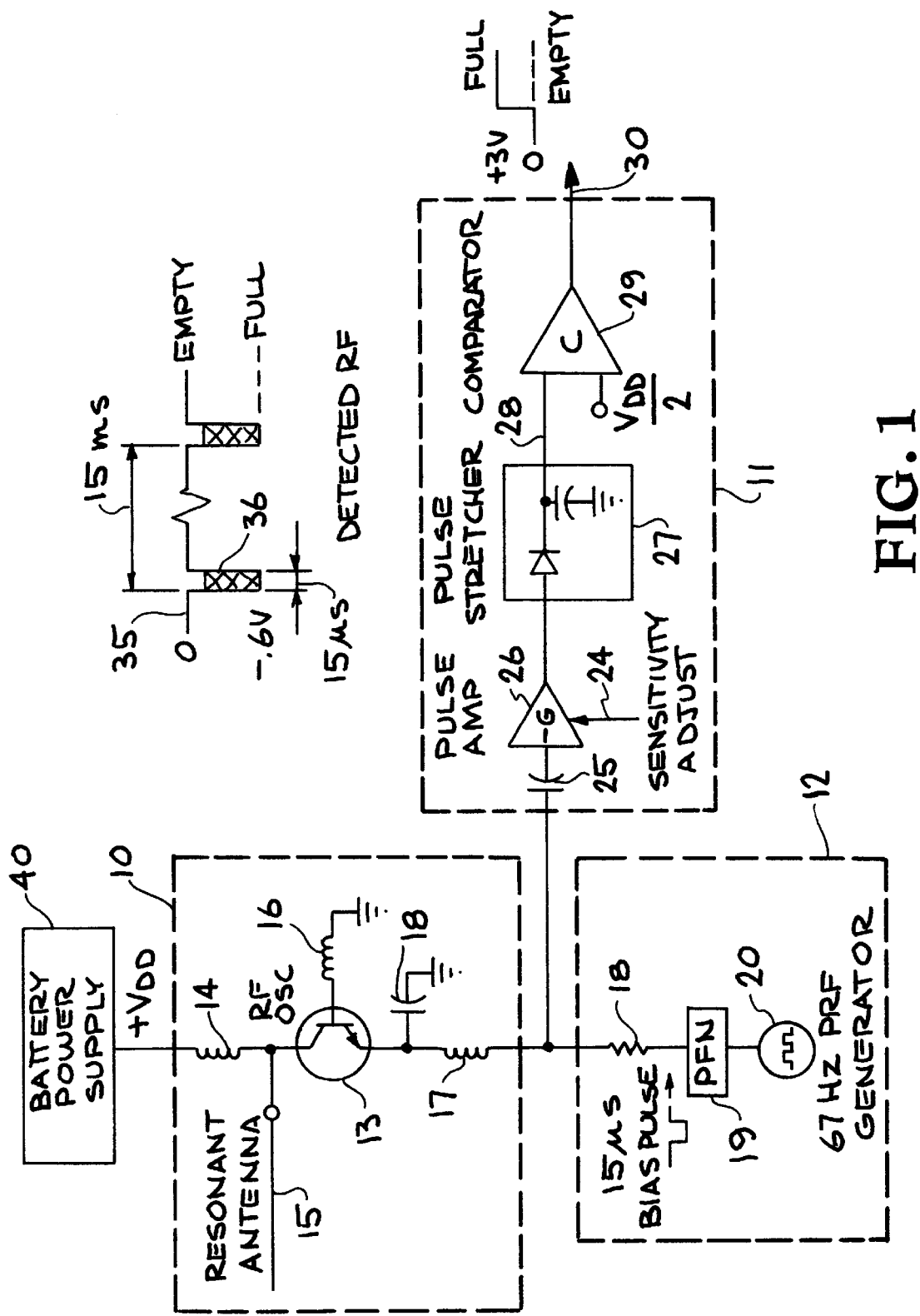
FIG. 1 provides a block diagram of the sensor according to the present invention.

A detailed description of a preferred embodiment of the present invention is provided with reference to the Figures. As shown in FIG. 1, the system comprises an RF oscillator 10, a detector circuit 11, and a control circuit 12. The RF oscillator 10 consists of a bipolar transistor 13 having its collector coupled through inductor 14 to a supply $V_{DD}$. The supply $V_{DD}$ is provided by power supply 40, such as a simple battery driven supply. Also, the collector of the transistor 13 is coupled to a resonant antenna 15. The base of transistor 13 is coupled through inductor 16 to ground. The emitter of transistor 13 is coupled through inductor 17 to the control circuit 12, and across capacitor 18 to ground. Also, the detector 11 is coupled to the emitter of transistor 13 through inductor 17. The control circuit 12 is connected to inductor 17 at resistor 18. A pulse forming network 19 generates a sequence of pulses which turn off and on the oscillator 10 with a pulse repetition frequency. A reference oscillator 20 drives the pulse forming network 19 at a pulse repetition frequency.

The detector circuit 11 is AC coupled to the emitter of transistor 13 through capacitor 25. An inverting amplifier 26, which can be adjusted for sensitivity as indicated by line 29, drives a pulse stretching network 27. The pulse stretcher supplies its output on line 28 to a comparator 29. The output of the pulse stretcher on line 28 is compared to a reference value, such as $V_{DD}/2$ at comparator 29 to generate an output on line 30, which has a first binary state (e.g. 0) when the container is empty near the antenna, and a second binary state (e.g. 1) when the container is full near the antenna.

The oscillator 10 can be turned on and off with a very low duty cycle, such as in the embodiment shown in FIG. 1 where the pulse repetition frequency is about 67 Hz, and the pulse width generated by the pulse forming network 19 is about 15 microseconds. Thus, the oscillator 10 will oscillate in a sequence of 15 microsecond bursts spaced apart by about 15 milliseconds for the duty cycle of about 0.1%. This allows the circuit to operate on a low cost battery for a very long period of time.

As indicated at trace 35 in FIG. 1, the level of oscillation during the bursts at point 36 will drop substantially if the resonant antenna is in proximity to a material which affects the impedance of the antenna and thus reduces the "Q" of the oscillator 10. Depending on the threshold set in comparator 29, the trip point for the detector 11 can be controlled.

The RF sensor operates on the principle of detecting the amplitude of oscillation of a pulsed RF oscillator 10 that includes the sensing antenna 15. When the sensing antenna 15 is not near a fluid, the Q of the sensing antenna/oscillator circuit is high and the oscillation amplitude of the single transistor RF oscillator is high. When the sensing antenna 15 is brought into near proximity of a fluid, or other material, losses go up, the Q decreases, and the amplitude of oscillation decreases. The oscillator transistor is a silicon bipolar device in a Colpitt's oscillator configuration in a preferred system, and its oscillations cause rectification at the base-emitter junction, providing a DC voltage related to the amplitude of oscillation at the emitter. This feature eliminates the need for a separate rectifying circuit, such as a Schottky diode.

The RF oscillator's low duty cycle, such as 0.1%, reduces both DC power consumption and RF emissions. This sensor is FCC Part 15 compliant, as an unintentional radiator, since only near-field effects are used. The low duty cycle and near field characteristics provide good immunity from interference. Typically, the sensor may be set to operate in the 2 GHz band for a wall thickness of less than 0.25 inches, and the 300 MHz band is used for wall thicknesses of less than about 1 inch.

Thus, the sensor shown in FIG. 1 shows a 67 Hz pulse repetition frequency generator which drives a pulse forming network 19 that supplies 15 microsecond pulses to the Colpitt's oscillator formed by transistor 13. The inductor 14 in the collector along with a capacitor 18 in the emitter circuit and stray capacitance define the frequency of oscillation. The resonant antenna 15 is typically-a-one-quarter-wavelength wire at 2 GHz. Other resonant structures, such as a microstrip patch, may form the antenna. At 300 MHz the antenna need not be resonant, that is it may be less than one-quarter wavelength long, but the combination of the antenna and oscillator should be resonant, particularly in the collector circuit. When the antenna length is shorter than one-quarter wavelength, it provides a capacitive reactance to the collector circuit, which in combination with inductor 14, resonates at the frequency of the oscillator.

The base-emitter junction rectifies the pulsed RF oscillations into a pulse voltage shown at trace 35 in FIG. 1. These pulses are amplified, stretched to a nearly steady level by pulse stretcher 27, and applied to a threshold comparator 29. Strong oscillations provide near zero voltage levels and do not trip the comparator, indicating no fluid nearby. When a fluid is present, the pulse amplitude increases in the negative direction, and the stretched voltage increases, tripping the comparator. In operation, the 2 GHz version provides a very sharp indication of fluid level, with less than one-sixteenth inch uncertainty. The trip point occurs when the fluid is precisely lined up with the antenna wire, when the antenna wire is disposed horizontally on the exterior wall of a plastic container.

Figure 2:
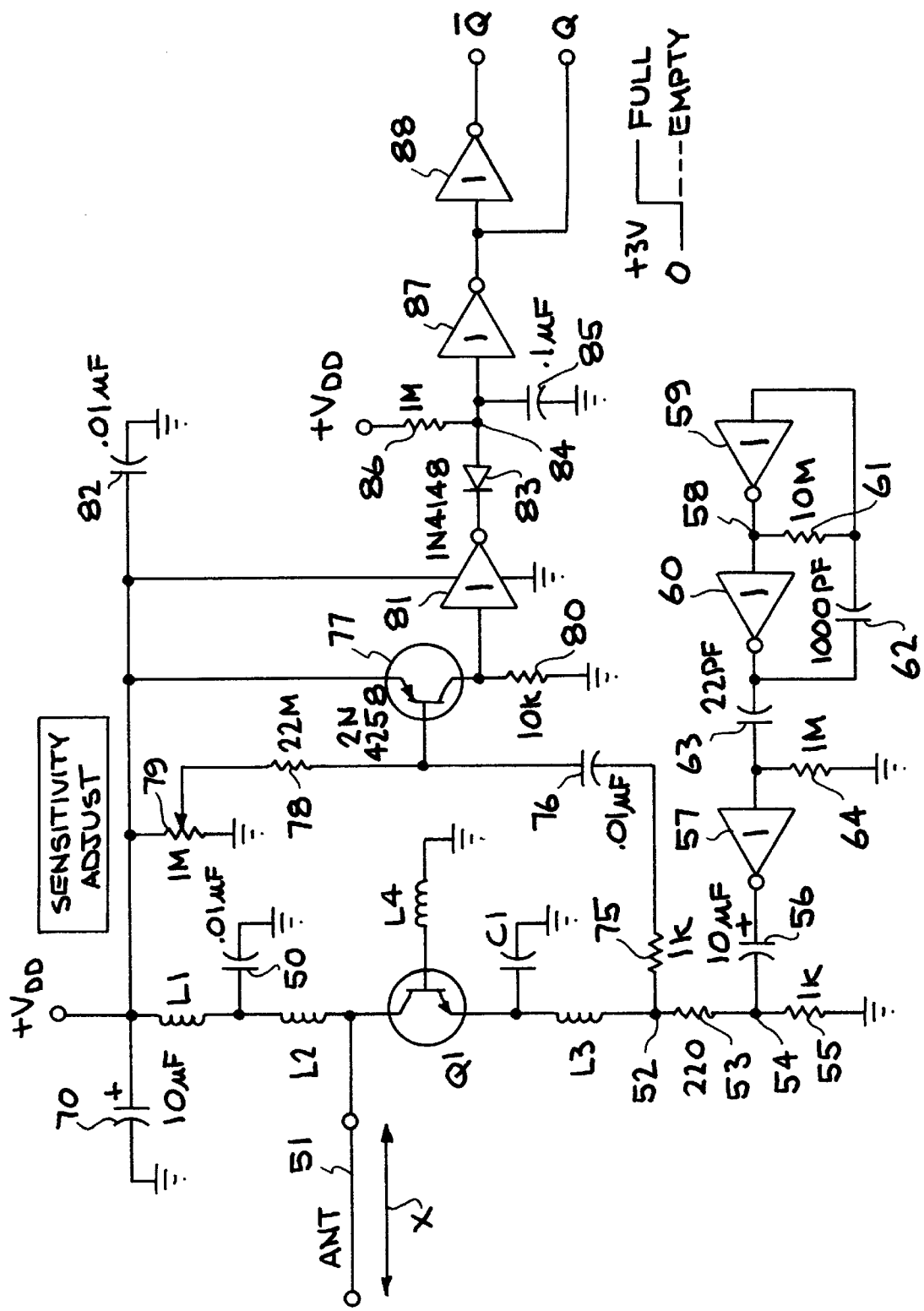
FIG. 2 provides a circuit level schematic of one embodiment of the present invention.

FIG. 2 illustrates a circuit schematic diagram of one embodiment of the sensor shown in FIG. 1. The circuit is based on transistor Q1 which has its base coupled through inductor L4 to ground. The collector of transistor Q1 is coupled through series inductors L2 and L1 to the supply $+V_{DD}$. A capacitor 50 is coupled between the node between inductors L1 and L2 and ground. Capacitor 70 is coupled between the supply terminal $V_{DD}$ and ground.

The collector of transistor Q1 is also coupled to the resonant antenna 51 having a length "X".

The emitter of transistor Q1 is coupled through inductor L3 to node 52. Node 52 is coupled across resistor 53 to node 54. Node 54 is coupled across resistor 55 to ground.

Node 54 is coupled to capacitor 56. Capacitor 56 is driven by the output of inverter 57. The input of inverter 57 is driven by the pulse repetition oscillator generally 58 which is composed of series inverters 59 and 60. The output of inverter 59 is coupled to the input of inverter 60, and through resistor 61 to its input. The output of inverter 60 is coupled through capacitor 62 to the input of inverter 59. The output of inverter 60 is a clock signal having a pulse repetition frequency of about 67 Hz. Also, a capacitor 63 is coupled to the output of inverter 60 and the input of inverter 57. Resistor 64 is coupled from the input of inverter 57 to ground. This combination provides a control signal at node 54 which turns on and off the oscillator at the pulse repetition frequency, and with a duty cycle of about 0.1%.

Node 52 in the emitter circuit of transistor Q1 is connected through resistor 75 and capacitor 76 to the base of PNP transistor 77. Also, the base of PNP transistor 77 is coupled through a sensitivity adjustment circuit including resistor 78 and adjustable resistor 79 in series. The emitter of transistor 77 is coupled to the supply $V_{DD}$. The collector of transistor 77 is coupled through resistor 80 to ground. Also, the collector of transistor 77 is coupled to the input of inverter 81. Inverter 81 has its supply terminal coupled to the $V_{DD}$ reference, and across capacitor 82 to ground. The output of inverter 81 is coupled to the cathode of diode 83. The anode of diode 83 is coupled to node 84. A capacitor 85 is coupled from node 84 to ground. The resistor 86 is coupled from node 84 to the supply $V_{DD}$. Also, node 84 is coupled to the input of inverter 87. The output of inverter 87 is coupled to the input of inverter 88. Also, the output of inverter 87 provides a control signal Q. The output of inverter 88 provides control signal Q (bar). The signals Q and Q (bar) provide the output of the circuit.

Using the representative component values in FIG. 2, the circuit illustrated can be used for either a 2 GHz or a 300 MHz oscillator. Table 1 provides the component values for the respective frequencies of items listed in the first column of the table.

TABLE 1

| ITEM  | 300 MHZ | 2 GHz   |
|-------|---------|---------|
| $Q_1$ | 2N5770  | BFR92   |
| X     | 6"      | 1½"     |
| $L_1$ | 0       | 100 nH  |
| $L_2$ | 200 nH  | 4 nH    |
| $L_3$ | 1 µH    | 100 nH  |
| $L_4$ | 82 nH   | 0       |
| C1    | 2 pF    | 0       |

As an assembly, the sensor forms a one-half wave dipole, although the circuit may exceed one-quarter wavelength, converting the antenna into a one-quarter wavelength monopole.

Figure 3:
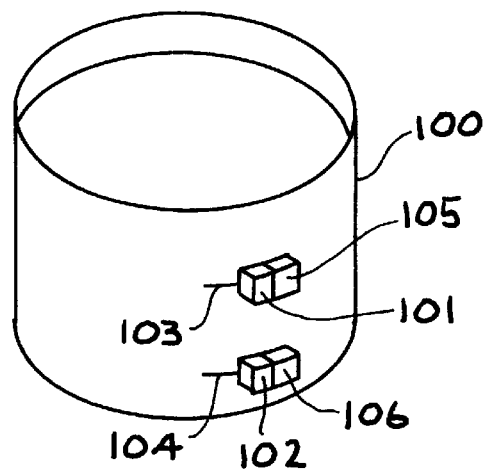
FIG. 3 illustrates an application of the present invention on an exterior wall of a vat.

FIG. 3 illustrates application of the present invention and has a level sensor on a vat 100. Thus, first sensor 101 and a second sensor 102 are mounted on the outside surface of the container 100. The sensor 101 has an antenna 103 which is horizontally disposed on the outside surface of the container 100 near a "full" level for the container 100. Sensor 102 has an antenna 104 horizontally disposed on the outside surface of the container 100 near an "empty" level for the container. When the fluid level reaches an area in proximity to antenna 103, then an indicator light 105 is activated. When the material falls below the level of antenna 104, then the light 106 is activated.

Figure 4:
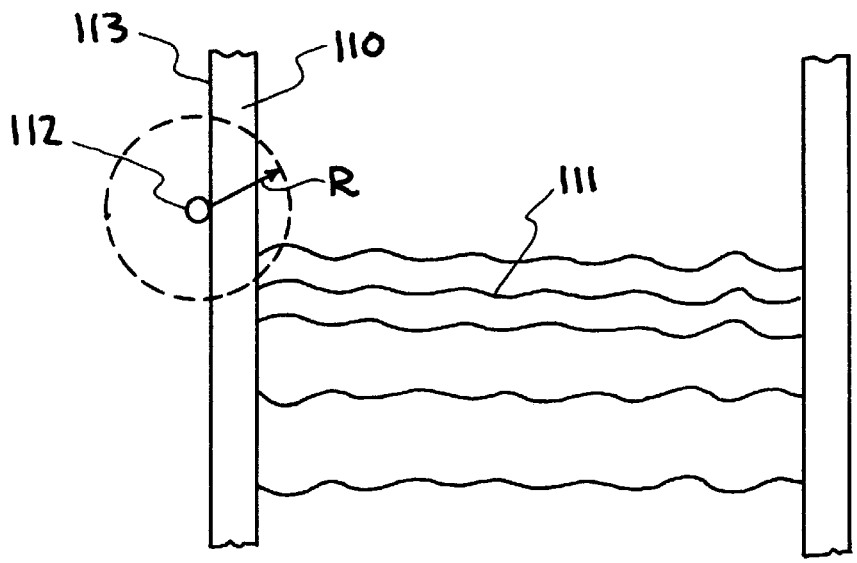
FIG. 4 is a cross-sectional view illustrating operation of the sensor when mounted on the exterior wall of the vat.

FIG. 4 illustrates a principle of operation of the present invention. Thus, FIG. 4 shows a container wall 110. A material 111 is enclosed within the container. The antenna 112 is shown in cross-section, and mounted on the exterior surface 113 of the container wall 110. The characteristic impedance of the antenna varies as a function of the materials in proximity to the antenna 112. This sensitivity falls off rather rapidly with radius R away from the antenna. Thus, when the material 111 within the container comes within close proximity of the antenna 112, the Q of the oscillator is affected enough to trip the level sensor. Otherwise, the level sensor will not be tripped.

Figure 5:
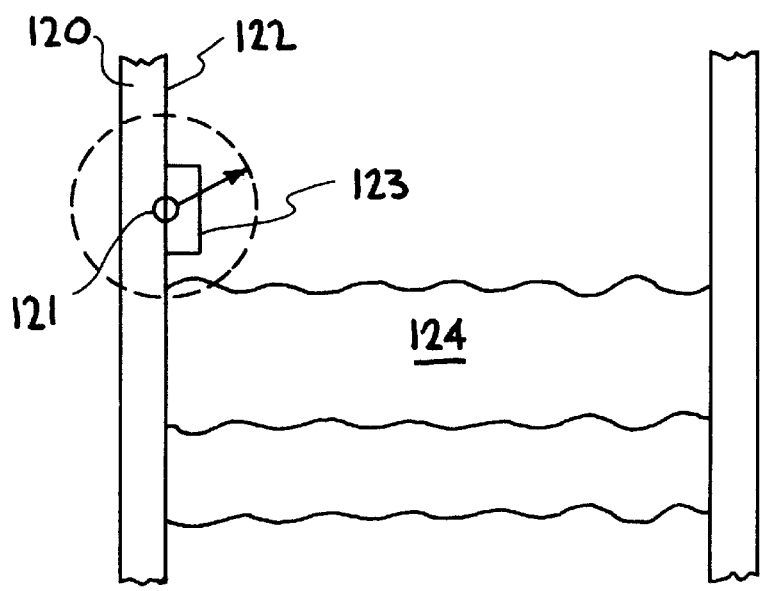
FIG. 5 is a cross-sectional view illustrating operation of the sensor when mounted within an encapsulation on the inside of a vat.

FIG. 5 illustrates yet an alternative embodiment of the present invention in which the antenna is mounted inside the container. Thus, a container wall 120 can have an antenna 121 mounted near the inside surface 122 of the container wall. An encapsulation 123 surrounds the antenna 121, and protects it from the material 124 within the container. The encapsulation 123 may be composed of a plastic material which is resistant to corrosive effects, or other hostile characteristics, of the material 124 in the container.

It can be understood that the examples illustrated with respect to FIGS. 3 through 5 are for level sensors in containers. As is mentioned above, the proximity detector of the present invention has a wide variety of other applications, such as in robotics, elevator design, and the like.

Furthermore, the present invention is based on a single silicon bipolar transistor oscillator, that is very simple and inexpensive to produce. Other transistor technologies, such as JFET or gallium arsenide MESFET, might be used to form the sensor of the present invention.

Accordingly, a micropower RF level sensor has been provided comprising a resonant RF circuit including an antenna that is positioned in close proximity to a non-metallic container. The near proximity of fluid or other material in the container spoils the Q of the resonant circuit and decreases the amplitude of the RF voltage impressed on it. This change of amplitude is detected and used as an output signal, allowing the sensor to act as a proximity switch or a limit switch. The advantages of the sensor include:

1) Operation through non-metallic container walls,
2) It is not falsely activated by wetting or foam on the container inner wall,
3) It operates through deposits and grime,
4) It can run on two pen light batteries for years,
5) It requires less than $2.00 in electronic components.

There are a wide variety of possible uses of the sensor. In the automotive field of use, the sensor can be used as a low-level indicator for windshield fluid, radiator fluid, crank case and transmission oil, et cetera. Industrial applications include vat fill levels, particularly where the fluid is corrosive or flammable. Agricultural use may include automatic cattle trough water level sensing, where the sensor is powered by small batteries for years. Generally, this sensor can replace float valves, such as used in toilets. The sensor can also be used to detect basement flooding or drain backups. It can be hermetically sealed and is thus impervious to environmental degradation, unlike existing moisture sensors that must be fully exposed to the environment.

The forgoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

I claim:

1. An apparatus for detecting a proximity of a material, comprising:

an oscillator which oscillates at a nominal frequency and produces an oscillator signal;

an antenna coupled to the oscillator which is resonant at the nominal frequency of the oscillator and which has a characteristic impedance which depends on materials in proximity to the antenna; and a detector coupled to the oscillator which detects changes in the oscillator signal as a result of changes in the characteristic impedance of the antenna caused by changes in materials in proximity to the antenna.

2. The apparatus of claim 1, including circuitry for turning the oscillator on and off at a pulse repetition frequency so that the oscillator produces the oscillator signal in bursts.

3. The apparatus of claim 2, wherein the oscillator signal has a duty cycle of less than 1%.

4. The apparatus of claim 1, wherein the detector is responsive to amplitude of the oscillator signal.

5. The apparatus of claim 1, wherein the oscillator has a frequency of greater than 100 MHz.

6. The apparatus of claim 1, wherein the oscillator has a frequency of greater than 1 GHz.

7. The apparatus of claim 1, wherein the oscillator has a nominal frequency, and the antenna comprises a straight monopole about one quarter wavelength long at the nominal frequency.

8. The apparatus of claim 1, wherein the oscillator comprises a bipolar device, having a base, an emitter and a collector, and having a base-emitter junction which rectifies resonant signals at its collector to produce the oscillator signal.

9. The apparatus of claim 8, wherein the detector is responsive to amplitude of the oscillator signal.

10. The apparatus of claim 8, including circuitry, coupled to the emitter of the bipolar device, for turning the oscillator on and off at a pulse repetition frequency so that the oscillator produces the oscillator signal in bursts, and with a duty cycle of less than 1%.

11. The apparatus of claim 1, including a battery driven power supply.

12. An apparatus for detecting a level of material in a container, comprising:
   an oscillator which oscillates at a nominal frequency and produces an oscillator signal;
   an antenna coupled to the oscillator which is resonant at the nominal frequency of the oscillator and which has a characteristic impedance which depends on proximity of the material in the container to the antenna; and
   a detector coupled to the oscillator which detects changes in the oscillator signal as a result of changes in the characteristic impedance of the antenna caused by proximity to the antenna of the material in the container.

13. The apparatus of claim 12, including circuitry for turning the oscillator on and off at a pulse repetition frequency so that the oscillator produces the oscillator signal in bursts.

14. The apparatus of claim 13, wherein the oscillator signal has a duty cycle of less than 1%.

15. The apparatus of claim 12, wherein the detector is responsive to amplitude of the oscillator signal.

16. The apparatus of claim 12, wherein the oscillator has a frequency of greater than 100 MHz.

17. The apparatus of claim 12, wherein the oscillator has a frequency of greater than 1 GHz.

18. The apparatus of claim 12, wherein the oscillator has a nominal frequency, and the antenna comprises a straight monopole about one quarter wavelength long at the nominal frequency.

19. The apparatus of claim 12, wherein the oscillator comprises a bipolar device, having a base, an emitter and a collector, and having a base-emitter junction which rectifies resonant signals at its collector to produce the oscillator signal.

20. The apparatus of claim 19, wherein the detector is responsive to amplitude of the oscillator signal.

21. The apparatus of claim 20, including circuitry, coupled to the emitter of the bipolar device, for turning the oscillator on and off at a pulse repetition frequency so that the oscillator produces the oscillator signal in bursts, and with a duty cycle of less than 1%.

22. The apparatus of claim 12, including an encapsulation on the antenna to isolate the antenna from corrosive effects of the material.

23. The apparatus of claim 12, wherein the antenna is mounted on the container at a level to be monitored.

24. The apparatus of claim 12, wherein the antenna is mounted on an outside surface of the container at a level to be monitored.

25. The apparatus of claim 12, including a battery driven power supply.

26. An apparatus for detecting a proximity of a material, comprising:
   an antenna which is resonant at a nominal frequency and has a characteristic impedance which depends on proximity to the antenna of the material;
   a transistor having a first terminal coupled to the antenna to provide theretogether a radio frequency resonant circuit which oscillates at the nominal frequency at which the antenna is resonant with an amplitude dependent on the characteristic impedance of the antenna, a second terminal receiving a bias potential and a third terminal;
   a detector coupled to the transistor which detects changes in the oscillation of the resonant circuit as a result of changes in the characteristic impedance of the antenna caused by changes in materials in proximity to the antenna; and
   a control circuit coupled to the third terminal of the transistor which turns the transistor on and off with a duty cycle to produce a sequence of bursts of oscillations at the nominal frequency.

27. The apparatus of claim 26, wherein the detector comprises a threshold detector coupled to the third terminal of the transistor which indicates when the amplitude of the bursts of oscillations decreases by a threshold amount.

28. The apparatus of claim 26, wherein the duty cycle of the control circuit is less than 1%, and the detector comprises a pulse stretching circuit coupled to the third terminal of the transistor, and a threshold detector coupled to the pulse stretching circuit which indicates when the amplitude of the bursts of oscillations decreases by a threshold amount.

29. The apparatus of claim 28, wherein the transistor comprises a bipolar transistor, and the first terminal is the collector, the second terminal is the base and the third terminal is the emitter of the bipolar transistor.

30. The apparatus of claim 26, wherein the nominal frequency is greater than 100 MHz.

31. The apparatus of claim 26, wherein the nominal frequency is greater than 1 GHz.

32. The apparatus of claim 26, wherein the nominal frequency is in a range from 300 MHz to 5 GHz.

33. The apparatus of claim 26, including an encapsulation on the antenna to isolate the antenna from corrosive effects of the material.

34. The apparatus of claim 26, wherein the antenna is mounted on an exterior wall of a container, and disposed horizontally to detect whether the container is filled to a level near the antenna.

35. A method for detecting proximity of a material to a particular location, comprising:

placing an antenna having a characteristic impedance which depends on materials in proximity to the antenna in the particular location;

establishing a resonating signal at a nominal frequency in the antenna; and detecting changes in the resonating signal at the nominal frequency as a result of changes in the characteristic impedance of the antenna caused by changes in materials in proximity to the antenna.

36. The method of claim 35, including turning the resonating signal on and off at a pulse repetition frequency.

37. The method of claim 36, wherein the resonating signal has a duty cycle of less than 1%.

38. The method of claim 35, wherein the step of detecting is responsive to amplitude of the resonating signal.

39. The method of claim 35, wherein the resonating signal has a frequency of greater than 100 MHz.

40. The method of claim 35, wherein the resonating signal has a frequency of greater than 1 GHz.

41. The method of claim 35, wherein the resonating signal has a nominal frequency, and the antenna comprises a straight monopole about one quarter wavelength long at the nominal frequency.

* * * * *